Patented Aug. 25, 1936

UNITED STATES PATENT OFFICE 2,052,216

4-HYDROXY-PYRENE AND PROCESS OF PREPARING IT

Martin Corell and Heinrich Vollmann, Frankfort-on-the-Main, Germany, assignors to General Aniline Works, Inc., New York, N. Y., a corporation of Delaware No Drawing. Application April 15, 1935, Serial No. 16,536. In Germany April 19, 1934

5 Claims. (Cl. 260—154)

The present invention relates to 4-hydroxypyrene and pyrene-4-sulfonic acid and to a process of preparing these compounds.

We have found that 4-hydroxypyrene may be obtained by a process which comprises diazotizing 3-aminopyrene-4-sulfonic acid (cf. U. S. patent application Serial No. 712,076 filed February 19, 1934, in the name of Martin Corell for "Aminopyrenesulfonic acids and a process of preparing them"), transforming the diazo compound thus obtained into pyrene-4-sulfonic acid according to known methods and melting pyrene-4-sulfonic acid with caustic alkalies.

The 4-hydroxypyrene which hitherto has not been described in the literature melts at 208° C. and dissolves in concentrated sulfuric acid to a characteristic carmine red solution having a brown olive fluorescence. Unlike the 3-hydroxypyrene melting at 179° C. (obtainable by melting alkali with 3-pyrenesulfonic acid which may be obtained by causing 1 mol. of chlorosulfonic acid to react upon a solution of pyrene in carbon tetrachloride) 4-hydroxypyrene couples in a smooth manner with diazo compounds. It may be used for the production of dyestuffs of various kinds.

The following example serves to illustrate the invention, but it is not intended to limit it thereto; the parts are by weight.

128 parts of sodium-3-aminopyrene-4-sulfonate, obtainable as described in Example 2 or 4 of the above mentioned U. S. patent application Serial No. 712,076 are suspended in a solution of 254 parts of water and 224 parts of concentrated hydrochloric acid. While cooling, a solution of 28 parts of sodium nitrite in 160 parts of water is added, drop by drop, at 0° C. to +5° C. Gradually the grey hydrochloride of the aminopyrenesulfonic acid assumes the yellow brown color of the diazosulfoanhydride. After stirring, for one hour, the diazotization is finished and the finely crystalline diazosulfoanhydride which is insoluble in water is filtered with suction. After thoroly washing it with ice-water, the paste is stirred into 500 parts of alcohol and warmed on the steam bath, while stirring. Hereby solution takes place accompanied by violent frothing and evolution of acetaldehyde. The alcohol is distilled off, the residue is taken up in water and the 4-pyrenesulfonic acid is salted out in the form of its sodium salt. The yield of sodium 4-pyrenesulfonate amounts to 100 parts.

62 parts of sodium 4-pyrenesulfonate are introduced into 300 parts of melted potassium hydroxide at 260° C. to 270° C. Reaction occurs with violent frothing. When sulfonic acid is no longer detectable, the melt is poured upon plates. The cooled melt is then pulverized, dissolved in hot water and acidified. After filtration by suction and drying, a crude 4-hydroxypyrene is obtained which may be purified by sublimation under strongly reduced pressure or recrystallization from chlorobenzene. The melting point of pure 4-hydroxypyrene is at 208° C. It dissolves in concentrated sulfuric acid to a carmine red solution having a brown olive fluorescence.

We claim:
1. The process which comprises diazotizing 3-aminopyrene-4-sulfonic acid, transforming the diazo compound thus obtained into pyrene-4-sulfonic acid according to known methods and melting pyrene-4-sulfonic acid with caustic alkalies.
2. The compounds of the general formula:

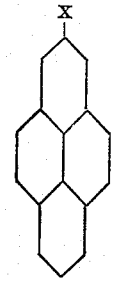

wherein X represents a hydroxyl or a sulfo group.
3. The compound of the formula:

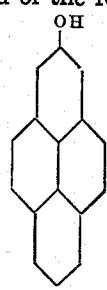

melting at 208° C. and dissolving in concentrated sulfuric acid to a carmine red solution.
4. The compound of the formula:

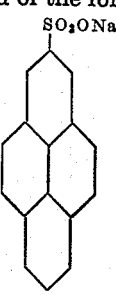

being soluble in water.
5. The process which comprises diazotizing 3-aminopyrene-4-sulfonic acid and transforming the diazo compound thus obtained into pyrene-4-sulfonic acid.

MARTIN CORELL.
HEINRICH VOLLMANN.